United States Patent
Stahl

(10) Patent No.: US 11,351,829 B2
(45) Date of Patent: Jun. 7, 2022

(54) CONSTRUCTION MACHINE AND METHOD FOR INCREASING THE STABILITY OF A CONSTRUCTION MACHINE

(71) Applicant: BOMAG GmbH, Boppard (DE)

(72) Inventor: Jonathan Stahl, Boppard (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 17/319,393

(22) Filed: May 13, 2021

(65) Prior Publication Data
US 2021/0362557 A1 Nov. 25, 2021

(30) Foreign Application Priority Data
May 20, 2020 (DE) .......................... 102020003044.0

(51) Int. Cl.
*B60G 17/016* (2006.01)
*B60G 17/015* (2006.01)
*B60G 17/019* (2006.01)

(52) U.S. Cl.
CPC ....... *B60G 17/0152* (2013.01); *B60G 17/016* (2013.01); *B60G 17/01941* (2013.01);
(Continued)

(58) Field of Classification Search
CPC ............. B60G 17/0152; B60G 17/016; B60G 17/01941; B60G 2202/413;
(Continued)

(56) References Cited

U.S. PATENT DOCUMENTS 7,338,335 B1* 3/2008 Messano ............ B60H 1/00428
 903/903
10,683,638 B2* 6/2020 Lamela ................ B60G 17/056
(Continued)

FOREIGN PATENT DOCUMENTS

DE 102013005594 A1 10/2014
DE 102014019168 A1 6/2016

*Primary Examiner* — Toan C To
(74) *Attorney, Agent, or Firm* — Wood Herron & Evans LLP

(57) ABSTRACT

The present invention relates to a construction machine, in particular a ground milling machine, with a drive motor, a machine frame supported by a traveling gear with traveling devices, and an operator platform arranged on the machine frame, wherein the traveling gear has a front and a rear traveling gear axle, and wherein at least one of the traveling gear axles is configured as a locking axle with two traveling devices which are height-adjustable relative to the machine frame independently of one another and can be locked in an operating position, and at least one further traveling gear axle is configured as a swing axle such that the traveling devices of the swing axle are jointly height-adjustable relative to the machine frame, and a height adjustment of one traveling device of the swing axle leads to an opposite height adjustment of another traveling device of the swing axle, wherein a control device is provided which is configured such that it detects the load on at least one of the traveling devices of the locking axle as a control variable and, when the load on the traveling device of the locking axle falls below or exceeds a threshold value, blocks the joint height adjustment of the traveling devices of the swing axle relative to the machine frame. Moreover, the present invention relates to increasing the stability of such a construction machine.

17 Claims, 4 Drawing Sheets

(52) U.S. Cl.
CPC .... *B60G 2202/413* (2013.01); *B60G 2300/09* (2013.01); *B60G 2400/61* (2013.01); *B60G 2400/63* (2013.01); *B60G 2500/30* (2013.01)

(58) Field of Classification Search
CPC ............ B60G 2300/09; B60G 2400/61; B60G 2400/63; B60G 2500/30
USPC .............. 280/6.153, 6.159, 124.159, 124.16, 280/124.161
See application file for complete search history.

(56) References Cited

U.S. PATENT DOCUMENTS

| | | | |
|---|---|---|---|
| 11,193,246 B2* | 12/2021 | Schlenker | B60G 17/0165 |
| 2013/0153310 A1* | 6/2013 | Steffen | B60G 17/056 |
| | | | 180/9.5 |
| 2015/0239316 A1* | 8/2015 | VanderWilt | B60G 17/005 |
| | | | 280/5.502 |
| 2016/0177522 A1* | 6/2016 | Nacke | B60G 17/016 |
| | | | 299/1.5 |
| 2017/0362782 A1* | 12/2017 | Musil | E01C 23/127 |
| 2017/0362784 A1* | 12/2017 | Hoffmann | E01C 23/127 |
| 2018/0229570 A1* | 8/2018 | Fay, II | B60G 21/073 |
| 2020/0122538 A1* | 4/2020 | Engelmann | B60G 21/073 |
| 2020/0199828 A1* | 6/2020 | Berning | E01C 23/088 |
| 2020/0263366 A1* | 8/2020 | Schlenker | G05D 1/0891 |
| 2021/0231134 A1* | 7/2021 | Schlenker | B60G 21/067 |
| 2021/0283971 A1* | 9/2021 | Doy | F15B 19/002 |
| 2021/0285468 A1* | 9/2021 | Doy | B60G 17/0165 |
| 2021/0301481 A1* | 9/2021 | Nieuwsma | E01C 23/127 |

\* cited by examiner

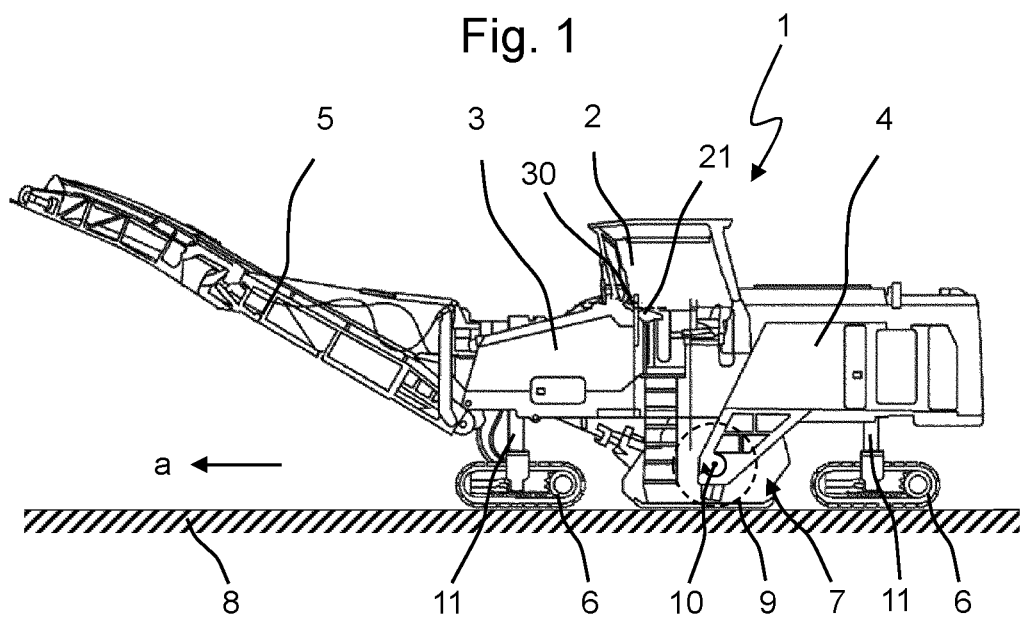
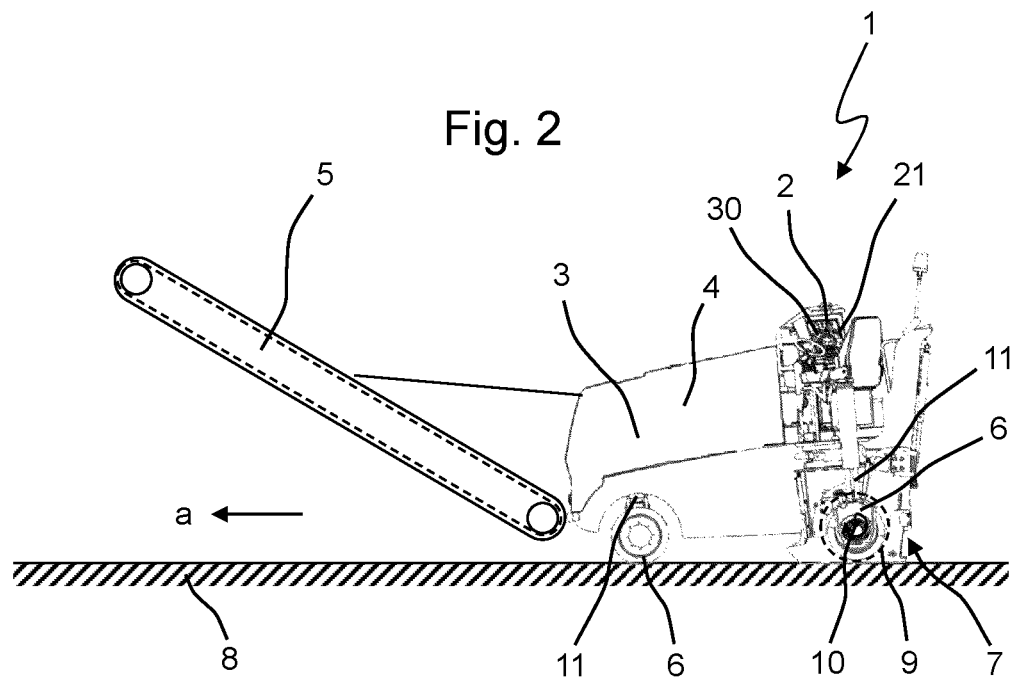

CONSTRUCTION MACHINE AND METHOD FOR INCREASING THE STABILITY OF A CONSTRUCTION MACHINE

CROSS-REFERENCE TO RELATED APPLICATION

The present application claims priority under 35 U.S.C. § 119 of German Patent Application No. 102020003044.0, filed May 20, 2020, the disclosure of which is hereby incorporated herein by reference in its entirety.

FIELD OF THE INVENTION

The present invention relates to a construction machine, in particular a ground milling machine. Moreover, the present invention relates to a method for increasing the stability of a construction machine.

BACKGROUND OF THE INVENTION

Generic construction machines have a machine frame supported by a traveling gear with traveling devices. The traveling devices may be, for example, wheels or crawler tracks. The construction machines comprise an operator platform arranged on the machine frame and a drive motor, which is typically a diesel internal combustion engine. The traveling gear of the generic construction machines has a front and a rear traveling gear axle. Typically, at least one of the traveling gear axles is designed as a locking axle, which in the present case means that it comprises two traveling devices that can be adjusted in height relative to the machine frame and locked in an operating position independently of one another. The locking axle thus comprises two traveling devices, each of which is configured to be height-adjustable relative to the machine frame, and whose height position can be set independently of one another in relation to the machine frame and is then fixed during operation. In this way, a desired position of the machine frame can be set, for example, in relation to the ground to be processed. The locked position in which the traveling devices are in working operation is called the operating position. Seen in the forward direction, the two traveling devices of the locking axle are thus arranged essentially at the same level and together functionally form a common standing axis. This does not mean that the two traveling devices are connected to each other via a common component axis. Rather, it is important that the two traveling devices are arranged essentially at the same level, for example at the rear, on both sides of the construction machine, as seen in the working direction or in the forward traveling direction of the construction machine. At least one further traveling gear axle of the construction machine is typically designed as a swing axle such that the traveling devices of the swing axle are jointly height-adjustable relative to the machine frame and a height adjustment of one traveling device of the swing axle leads to a height adjustment of the other traveling device of the swing axle in the opposite vertical direction. The swing axle thus also comprises, for example, two traveling devices which are height-adjustable relative to the machine frame and which, viewed in the working direction or in the forward traveling direction of the construction machine, are arranged essentially at the same level, for example at the front, on both sides of the construction machine. However, the height adjustment of the traveling devices of the swing axle is not independent of each other, but on the contrary dependent. If one traveling device is raised, the other traveling device is automatically lowered and vice versa. These two traveling devices are thus forcibly coupled to each other in a counterdirectional manner, for example mechanically and/or hydraulically. In this way, the swing axle ensures that any unevenness of the ground over which the machine passes is compensated during operation and does not, or only to a much lesser extent, cause the machine frame to tip relative to the ground to be processed, for example.

Thus, when the term "axle" is used in the present context, it refers in each case to a group of traveling devices that are arranged essentially at the same level in a longitudinal direction or a working direction of the construction machine, also with regard to a possible pivotability. Therefore, axle does not necessarily refer to an actually existing component, for example an axle or shaft extending between two traveling devices, for example wheels. In the present context, the term "traveling gear axis" refers, in particular, to functionally connected traveling devices or, in particular, traveling devices that are at the same level when viewed in the forward and/or working direction of the construction machine (but not necessarily at the same level in the vertical direction).

Construction machines of this type are, in particular, ground milling machines, for example road milling machines, recyclers, stabilizers, or surface miners. These machines are used in road and pathway construction and in the mining of near-surface mineral resources. The working unit of a typical ground milling machine comprises a milling drum, typically configured as a hollow cylinder, on the outer circumferential surface of which a plurality of milling tools, for example milling chisels, are arranged. The milling drum is arranged for rotation about a rotation axis within a milling drum box which surrounds the milling drum, for example in the form of a box or hood, and is open in the direction of the ground to be milled, i.e., toward the bottom. During operation, the milling drum rotates about the rotation axis running horizontally and transversely to the working direction so that the milling tools penetrate the ground and mill off ground material. The crushed milled material is, for example, transported away via a conveyor in a manner known per se or mixed with stabilizing agents and placed back on the ground. During the milling process, the ground milling machine moves over the ground in a working direction, thereby continuously removing material. Since the removal of ground material typically has to be carried out as uniformly as possible at a specified depth and, if necessary, at a beveled position of the milling drum relative to the ground, generic ground milling machines use the swing axle already described to compensate for unevenness of the ground over which the traveling units pass and to minimize its influence on the milling pattern. Such generic ground milling machines are known, for example, from applicant's DE 10 2013 005 594 A1 and DE 10 2014 019 168 A1.

However, the use of the swing axle is problematic with the generic construction machines when they work on ground surfaces that are not horizontal but have a bevel. Due to their technical design, generic construction machines typically have a comparatively high center of gravity, the center of gravity in this case meaning the center of mass. The beveled position of the machine frame on non-horizontal ground surfaces causes this center of gravity of the machine to shift, resulting in the worst case in the risk of the machine tipping over, especially if the machine experiences a transverse inclination (i.e., an inclination transverse to the forward direction) due to the bevel. This problem is exacerbated by the use of a swing axle. By combining a locking axle and a swing axle, the construction machine rests on three points on the ground. Two points are defined by the locked traveling devices of the locking axle, and another point is defined halfway between the traveling devices of the swing axle. Connecting these three points by so-called tipover lines results in a triangle. As long as the center of gravity of the machine is within this triangle in a projection onto a virtual horizontal reference plane, the machine will not tip. However, a beveled position of the machine frame, for example on beveled ground, causes the center of gravity of the machine to move towards one of the tipover lines. If the center of gravity reaches a tipover line, the machine will tip. Since the swing axle defines only one resting point for the machine, the tipover lines form a triangle with a comparatively small area in which the center of gravity can move without a risk of tipping. In other words, this results in the construction machine tipping more easily on beveled ground, with potentially catastrophic consequences in terms of the safety of the operator and bystanders. In addition, the construction machine is damaged. It is therefore a fundamental concern to make the construction machines as tip-resistant as possible.

One aspect of the present invention is to improve the operational safety of generic construction machines. In particular, the aim is to increase the tip resistance of generic construction machines in operation, and especially on beveled ground.

SUMMARY OF THE INVENTION

Specifically, in a generic construction machine described at the outset, one aspect of the present invention is achieved in that a control device is provided which is configured such that it detects the load on at least one of the traveling devices of the locking axle as a control variable and, when the load on the traveling device of the locking axle falls below or exceeds a threshold value, blocks the joint height adjustment of the traveling devices of the swing axle relative to the machine frame. Thus, a first basic aspect of the present invention is that it is possible to determine whether or not the machine is in danger of tipping sideways based on the load applied to the traveling devices of the locking axle. For example, if the construction machine travels along a slope on beveled ground, the load resting on the downhill traveling device of the locking axle increases, while the load on the uphill traveling device of the locking axle decreases. The more beveled the slope, the greater the load shift. As the slope becomes steeper and steeper, the load on the uphill traveling device of the locking axle decreases more and more. At the point where this load becomes zero, the machine tips. The load applied to the traveling devices of the locking axle is therefore directly a measure of the stability and also of the imminence of tipping of the machine and can therefore be used as a control variable. This load is therefore monitored continuously or at intervals throughout the entire operation of the machine, in particular, also in order to be able to determine dynamic load changes, for example. Another basic aspect of the present invention is that the stability of the machine on beveled ground can be increased by blocking the height adjustment of the swing axle. In terms of stability, the swing axle then acts as a further locking axle and likewise defines two resting points of the machine on the ground. The machine then rests on a total of four resting points, so that the connection of the tipover lines results in a quadrangular area. The area of this quadrangle is significantly larger than that of the triangle in the case of a non-blocked swing axle, so that the area projected onto a horizontal plane in which the center of gravity of the machine is allowed to move without tipping of the machine is increased. This results in a high stability of the construction machine even on steep slopes. The fact that in this case the advantages of the swing axle and its compensation for unevenness are foregone is accepted due to the potentially catastrophic consequences of the machine tipping. The optional and situation-dependent blocking of the swing function of the swing axle can thus significantly improve the stability of the machine in borderline situations. The present invention thus combines a diagnosis of the stability or risk of tipping of the machine via the load resting on the traveling devices of the locking axle with a countermeasure in the case of a risk of tipping, thus increasing the stability of the machine. Specifically, the countermeasure consists in blocking the height adjustment of the traveling devices of the swing axle, thereby converting the one resting point of the machine halfway on the connecting line between the two traveling devices of the swing axle into two respective resting points at the traveling devices of the swing axle.

The load can be determined, for example, as the weight of the machine resting on the traveling devices. It may be recorded directly as a direct numerical value and used as a control variable. For example, the load on one of the traveling devices of the locking axle may be monitored continuously or at intervals. Depending on whether this traveling device is positioned uphill or downhill on beveled ground, the load resting on it increases or decreases. This increase or decrease in load can be used to control the blocking of the swing axle. In principle, it is sufficient here to detect the load on one traveling device, especially since the construction machine is typically oriented parallel to the slope during working operation. In this case, the load on said one traveling device develops proportionally and in a direction opposite to the load on the other traveling device. If, for example, an increase in load is detected on one traveling device, this immediately results in a decrease of the load on the other traveling device of the locking axle. Alternatively, the load on both traveling devices of the locking axle may be monitored, in particular, continuously or at intervals. This prevents uneven distribution of loads, for example when the construction machine is not completely parallel to the slope, from causing errors. This further increases safety. It is then also possible to use the ratio between the load on the two traveling devices of the locking axle instead of the absolute values. In this way, a picture of the stability of the machine may be obtained that is more differentiated and includes other factors, such as the exact position of the machine in relation to the slope, compared to the exclusive measurement of a single traveling device of the locking axle.

The threshold value according to the present invention also refers to the load parameter selected in the specific implementation, for example the weight resting on the traveling device or its ratio between the traveling devices. The threshold value is selected such that the blocking of the height adjustment of the traveling devices of the swing axle takes place before the machine tips. Whether falling below or exceeding the threshold value triggers the lock depends on which values are detected. In one exemplary case, in which the load is detected at all traveling devices of the locking axle, it is also possible that the threshold value is then set such that falling below the threshold value at one of the traveling devices triggers the blocking of the height adjustment of the swing axle. This threshold value is then lower than the load applied to the traveling devices during operation on horizontal ground. The dropping of the load at the traveling device is the possible criterion, as this is a clear indication of imminent tipping or the danger of tipping of the machine. Thus, the height adjustment of the traveling devices of the swing axle is blocked in the case of a drop below this threshold value. If, on the other hand, the load is only detected at one traveling device and this traveling device is located downhill in the particular situation, a threshold value must be selected that is higher than the load applied to the traveling devices during operation on horizontal ground. If this threshold value is exceeded, blocking is activated. Such an increase in load is seen as an indirect indication that the load on the other traveling device of the locking axle is decreasing. In practical terms, such a threshold value may be set, for example, as a maximum permissible percentage or absolute deviation from an initial value or initial value distribution, for example with respect to a machine standing on a horizontal surface. For this purpose, for example, the weight distribution of the machine on the respective traveling units is determined and used as the initial value distribution. The deviation may now be set, for example, as a percentage and/or absolute deviation from one or more of the initial values, even individually for each traveling unit. A typical order of magnitude may be, for example, a maximum deviation of 50% of the individual weight at one of the traveling units or, for example, a maximum of 10%, in particular a maximum of 7%, of the total weight of the machine at one of the traveling units. Additionally or alternatively, a deviation from an initial or normal resting force at a traveling unit in the range of, for example, a maximum of 8t, especially a maximum of 3t, in particular a maximum of 1t, could also be defined as the threshold value. The determination of the particular threshold value(s) is expediently carried out in consideration of the particular circumstances. Further, a definition may be made by setting other parameters that correlate with the weight distribution.

The prior art offers a variety of different swing axle technologies. According to one embodiment, the construction machine has a hydraulic swing mechanism. In other words, it is possible that the traveling devices of the swing axle are configured to be height-adjustable via hydraulic lifting columns. Such hydraulic lifting columns are well known in the prior art and therefore need not be explained in more detail here. They comprise a hydraulic cylinder, in particular a double-acting hydraulic cylinder, which is used to adjust the height of the traveling devices in relation to the machine frame. The swing mechanism may be obtained in a simple way by a hydraulic connection between the rod sides and/or the piston sides of the hydraulic cylinders.

Blocking the height adjustment of the swing axle's traveling devices is also particularly easy to achieve with a hydraulic swing axle. According to one embodiment, at least one hydraulic blocking valve is provided via which the height adjustment of the traveling devices of the swing axle can be blocked. For example, the blocking valve blocks the hydraulic connection between the piston sides and/or the rod sides of the hydraulic cylinders of the lifting columns of the hydraulic swing axle or unblocks this connection. The blocking valve is controlled by the control device to block and/or release the corresponding connection.

Particularly, the hydraulic blocking valve may be a 2/2-way valve, which, in particular, is preloaded towards the blocking switching position. This can be achieved, for example, by spring preloading. This ensures that the blocking valve is in the blocked position even in the event of a defect in the control device and therefore maximum stability of the machine is guaranteed.

In another embodiment of the present invention, the traveling devices of the locking axle are configured to be height-adjustable via hydraulic lifting columns. In particular, the same explanations apply here as already given above for the traveling devices of the swing axle. Particularly, both the traveling devices of the locking axle and those of the swing axle are configured to be height-adjustable relative to the machine frame via hydraulic lifting columns. In this way, the entire system according to the present invention can be integrated particularly easily into the hydraulic system that is typically already present on generic construction machines.

For example, it is then advantageously possible for the control device to be a hydraulic control device and for the load on the at least one traveling device of the locking axle to be detected as a hydraulic pressure applied to the lifting column of the traveling device of the locking axle. The hydraulic pressure applied to the lifting column, for example on the piston side or the rod side of the hydraulic cylinder of the lifting column, is also a direct measure of the weight with which the machine presses on the respective traveling device and thus on the lifting column and its hydraulic cylinder. This pressure may therefore also be used as a control variable according to the present invention. Of course, the threshold value according to the present invention then also refers to a threshold value of this hydraulic pressure. The configuration of the control device as a hydraulic control device is particularly simple and robust since additional electronic components can be dispensed with. The use of the hydraulic components required for the hydraulic control device, on the other hand, has been tested and proven very successful for decades in the harsh working environment of construction machinery.

Generally, the hydraulic pressure can be detected by the hydraulic control device in a variety of ways. However, it is particularly easy to detect the pressure if the hydraulic control device detects the hydraulic pressure applied to the lifting column of the traveling device of the locking axle via a control line. In this embodiment, the control line according to the present invention is thus connected, for example, to the piston side or the rod side of the hydraulic cylinder of the lifting column of the traveling device, in particular, in such a way that the pressure applied to the hydraulic cylinder also exists in the control line. In this way, the hydraulic pressure representing the load on the traveling device is directly available via the control line, for example for controlling the blocking valve.

A particularly simple implementation of the hydraulic control device is achieved if the hydraulic pressure within the control line is used directly for controlling the blocking valve. It is therefore possible according to one embodiment that the hydraulic pressure applied to the lifting column of the traveling device of the locking axle is applied to the blocking valve via the control line, in particular, in such a way that this pressure counteracts the preload of the blocking valve to the blocked position. In other words, the control line provides a control pressure to the blocking valve. For example, the pressure at the hydraulic cylinder of the lifting column drops when a smaller load rests on the corresponding traveling device. In this case, the pressure in the control line also drops. If the pressure falls below the threshold value, it is no longer sufficient for holding the blocking valve in the open position against its preload. The preload of the blocking valve overcomes the control pressure and switches the blocking valve to the blocked position. This disconnects or blocks the connection between the piston sides or rod sides of the hydraulic cylinders of the lifting columns of the traveling devices of the swing axle and blocks their joint height adjustment in the sense of a swing mechanism. The force or strength of the preload of the blocking valve can be selected depending on the application and the required degree of safety and sets the threshold value for blocking the swing axle.

As an alternative to the hydraulic control device, or also as a supplementary redundancy function, according to a further embodiment of the present invention, the control device is an electronic control device and is connected to at least one load sensor, the load sensor detecting at least one of the following variables: A hydraulic pressure applied to the lifting column of at least one of the traveling devices of the locking axle and/or a weight applied to at least one traveling device of the locking axle and/or a transverse and/or longitudinal inclination of the machine frame. The electronic control device is configured to detect the value measured by the load sensor as a control variable which in turn represents the load on at least one of the traveling devices of the locking axle. In particular, the transverse and/or longitudinal inclination of the machine frame may also be used for this purpose, preferably both the transverse inclination and the longitudinal inclination, as this allows disturbing factors to be included, for example if the machine is not completely parallel to the slope. These values for the inclination of the machine frame can also be used to estimate how the load of the machine is distributed over the traveling devices of the locking axle. They can therefore also be used for control according to the present invention.

Generally, the load sensor may be a sensor of any type suitable to pick up the values described. Particularly, the load sensor may comprise an inclination sensor and/or a force transducer, in particular a load cell, a strain gauge and/or a piezoelectric sensor. Such sensors are particularly suitable for the present purpose.

If the swing axle is blocked according to the present invention, its function of compensating for ground unevenness is no longer available. In order to prevent problems arising from this in the work process as far as possible, it is advantageous if the operator of the machine is informed that the swing axle is currently blocked. It is therefore possible that an indicating apparatus is provided which is configured to provide an indication to the operator of the construction machine when the height adjustment of the traveling devices of the swing axle is blocked and/or released. The indicating apparatus may be, for example, a warning light that provides a visual signal. Additionally or alternatively, the indicating apparatus may also be a loudspeaker and provide an acoustic signal. The indicating apparatus may also comprise a display, for example the display of the on-board computer typically already present in generic machines. In this case, for example, the indicating apparatus is implemented in the on-board computer as a software which indicates the blocking of the swing axle to the operator via the display of the on-board computer.

Generally, the operator of the machine is to be able to unlock the swing axle at any time by manually entering a control command on the control device. In this way, the operator remains in full control of all machine functions at all times. In order to relieve the operator, the control device may additionally or alternatively be configured to release the joint height adjustment of the traveling devices of the swing axle relative to the machine frame when the load on the at least one traveling device of the locking axle exceeds or falls below the threshold value. In other words, the control device automatically cancels the blocking of the swing axle when the dangerous situation, i.e., the risk of the machine tipping, no longer exists. The corresponding assessment of the dangerous situation is carried out in an analogous manner, albeit inversely, to the above statements. If, for example, falling below the threshold value results in the swing axle being blocked, exceeding the threshold value results in it being released and vice versa. As an additional safety function, the height adjustment of the traveling devices of the swing axle may only be released upon exceeding or falling below the threshold value at least for a specified time interval. In this embodiment, therefore, exceeding or falling below the threshold value does not release the swing axle immediately but only after the specified time interval has elapsed. The specified time interval may be in the range of 1 to 10 seconds, for example. This ensures that the swing function is not released prematurely, which might endanger the stability of the machine.

The aspect of the present invention mentioned at the beginning is also achieved by a method for increasing the stability of a generic construction machine in operation, comprising the steps of: monitoring a load on at least one traveling device of a locking axle of the construction machine; comparing the load on the traveling device of the locking axle to a threshold value; and blocking a height adjustment of traveling devices of a swing axle of the construction machine if the load on the traveling device of the locking axle falls below or exceeds the threshold value. All the features, effects and advantages mentioned above in connection with the construction machine apply mutatis mutandis to the process according to the present invention and vice versa. Therefore, to avoid repetitions, reference is made to the respective other statements. The method according to the present invention is carried out, in particular, by the control device.

According to a modified embodiment of the method according to the present invention, the step of blocking the height adjustment is followed by indicating a warning to the user of the construction machine. In this way, the operator is made aware that the swing axle is blocked.

In order to further relieve the operator as much as possible, monitoring of the load on the traveling device of the locking axle and comparing to the threshold value may advantageously be continued even after blocking, and upon exceeding or falling below the threshold value on the traveling device of the locking axle, at least one of the following steps may be carried out: unblocking the height adjustment of the traveling devices of the swing axle of the construction machine and/or stopping the display of the warning. In this way, both the blocking and unblocking of the swing axle can be performed automatically by the control device, so that the operator does not need to be concerned with this at all and can concentrate on his other tasks.

BRIEF DESCRIPTION OF THE DRAWINGS

The present invention will now be explained in more detail by reference to the embodiment examples shown in the figures. In the schematic figures:

FIG. 1 shows a road milling machine of the center rotor type;

FIG. 2 shows a road milling machine of the rear rotor type;

DETAILED DESCRIPTION OF THE INVENTION

Figure 3:
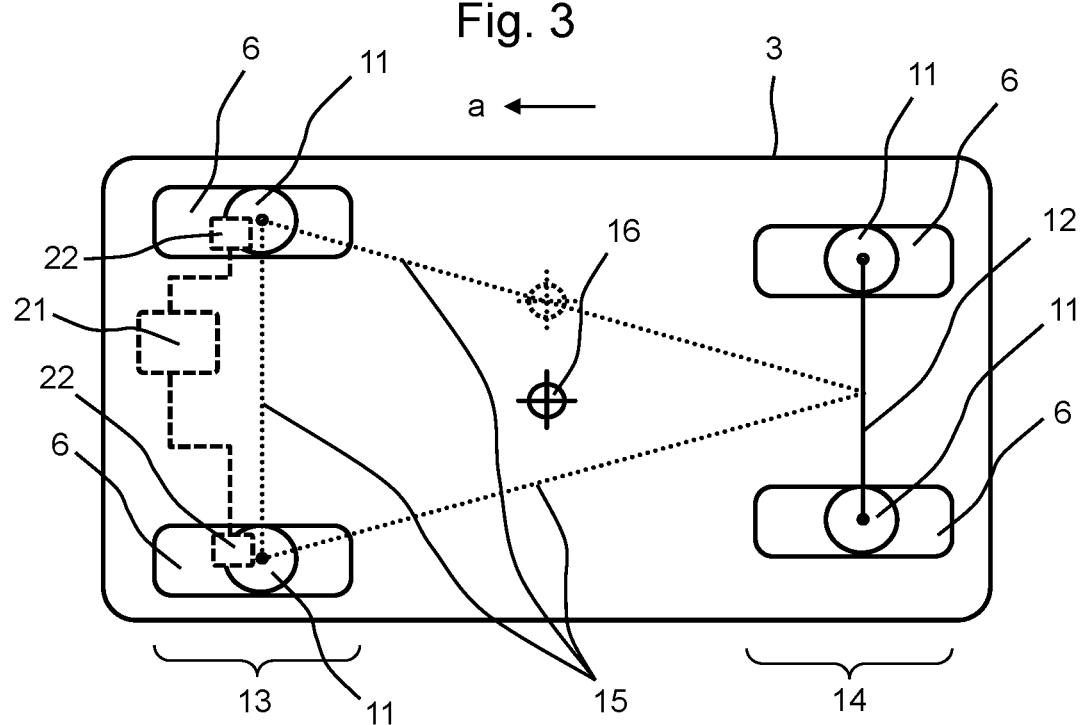
FIG. 3 is a top view of the machine's resting points when the swing axle is active.

FIGS. 1 and 2 show generic construction machines, more specifically ground milling machines 1. The ground milling machines 1 are configured as a center rotor type milling machine (FIG. 1) or as a rear rotor type milling machine (FIG. 2). They have a machine frame 3 with an operator platform 2 supported by a traveling gear with traveling devices 6. The traveling devices 6 are configured as crawler tracks in the case of the center rotor type milling machine according to FIG. 1 and as wheels in the case of the rear rotor type milling machine according to FIG. 2. In addition, the ground milling machines 1 comprise a drive motor 4, for example a diesel combustion engine, and a conveyor 5 for transferring milled material to a transport device not shown. The primary working unit of the ground milling machines 1 is a milling drum 9 mounted in a milling drum box 7 for rotation about a rotation axis 10. The milling drum 9 is equipped with a plurality of milling tools on its outer circumferential surface and is rotated about the rotation axis 10 during working operation of the ground milling machine 1. During this process, the milling tools, which are configured as milling chisels, are driven into the ground 8 and mill it off. During the milling process, the ground milling machines 1 move forward in the working direction a so that ground material of the ground 8 is continuously milled by the milling drum 9.

In the two ground milling machines 1 shown, all traveling devices 6 are height-adjustable relative to the machine frame 3 via lifting columns 11. The lifting columns 11 are hydraulic lifting columns, i.e., they comprise a double-acting hydraulic cylinder which serves as an actuator for the height adjustment. In this way, the milling depth, i.e., the depth at which the milling drum 9 mills off the ground 8, can also be set during working operation of the ground milling machines 1. In order to avoid, as far as possible, an abrupt change of the milling depth even in the case of unevenness of the ground 8, the ground milling machines 1 have a swing axle 14 (see, FIGS. 3 to 5). The swing axle 14 is formed, for example, by the two rear traveling devices 6 of the ground milling machines 1 in the working direction a. It is characterized by the fact that the two traveling devices 6 are forcibly guided in an inverse manner. For example, one traveling device 6 is forcibly adjusted downward in the vertical direction when the other traveling device 6 is adjusted upward in the vertical direction, for example because the ground milling machine 1 ascends an unevenness on the ground 8. In this way, a change of the milling depth and thus an unevenness of the milling bed is avoided as far as possible. In the case of the ground milling machines 1 shown, for example, the front traveling gear axle is configured as a locking axle 13 (see, FIGS. 3 to 5). This means that the traveling devices 6 of the front traveling gear axle are height-adjustable relative to the machine frame 3 independently of each other. Thus, with these traveling devices 6, there is no forced coupling of the height adjustment movement. They can be moved to a desired height position and fixed in this position. Typically, the traveling devices 6 of the locking axle 13 remain in this fixed operating position during operation of the ground milling machine 1.

Figure 4:
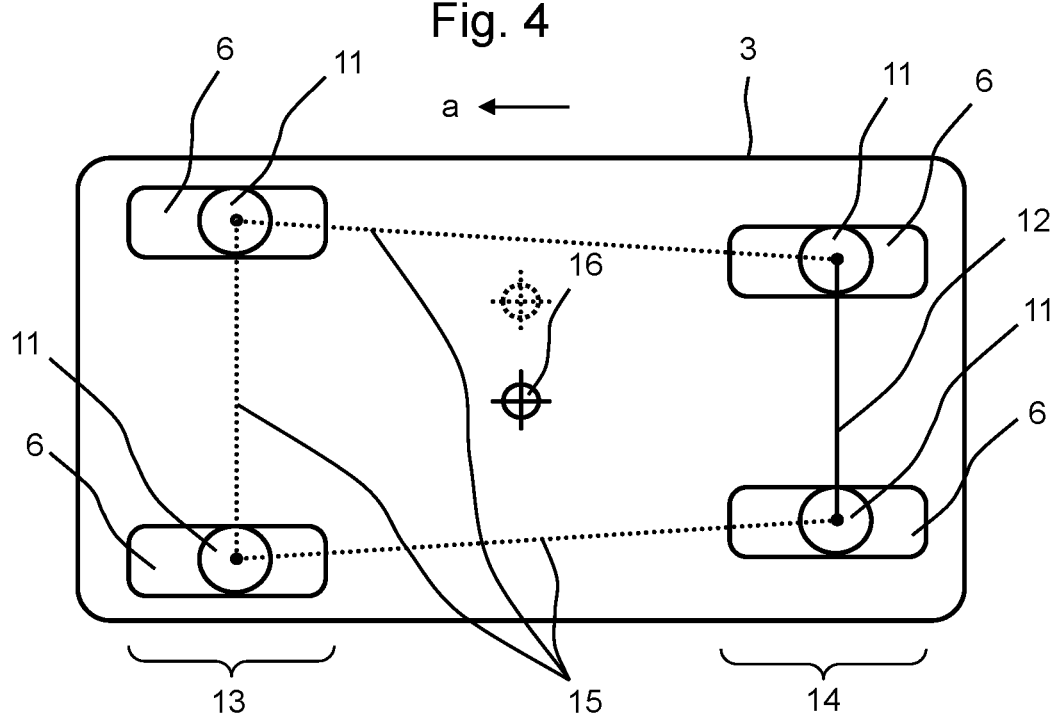
FIG. 4 is a top view of the machine's resting points when the swing axle is blocked.

FIGS. 3 and 4 each show a top view of the contour of the machine frame 3 of the ground milling machines 1 and its resting points, which correspond to the traveling devices 6 of the locking axle 13 and the swing axle 14. To show that the height adjustment of the traveling devices 6 of the swing axle 14 is forcibly coupled, the swing connection 12 is drawn, representing for example the hydraulic connection of the piston and/or rod side of the hydraulic cylinders. In the situation shown in FIG. 3, the swing mechanism of the swing axle 14 is active. The swing axle 14 has thus not been blocked, so that the traveling devices 6 can be adjusted in height, for example when running over an unevenness on the ground 8. Since the traveling devices 6 of the swing axle 14 are therefore freely height-adjustable relative to the machine frame 3 within the structural conditions of the lifting columns 11, the traveling devices 6 of the swing axle 14 do not provide any fixed-height resting points for the machine when the swing mechanism is activated. Across the entire swing axle 14, only one resting point is formed in the center of the connection line between the two traveling devices 6, which is shown as swing connection 12. In the situation according to FIG. 3, the ground milling machine 1 thus rests on three resting points that are fixed relative to the ground 8, more specifically the two traveling devices 6 of the locking axle 13 and the center point of the swing axle 14. Connecting these three points with tipover lines 15 results in the triangle shown in FIG. 3. The center of gravity 16 of the ground milling machine 1, more specifically the center of mass, is essentially in the region of the center of the machine as long as the ground milling machine 1 is operating on horizontal ground. With varying inclination of the machine frame 3 relative to the ground 8, the center of gravity 16 moves in a projection on a horizontal surface, as shown in FIGS. 3 and 4 by the dotted center of gravity shifted due to inclination of the machine. As long as the center of gravity 16 is within the region outlined by the tipover lines 15, the machine is stable. If the center of gravity 16 reaches one of the tipover lines 15 at any point due to an inclination of the machine frame 3 relative to the ground, the machine begins to tip in that direction. If the center of gravity 16 moves beyond the tipover line 15, the machine tips over.

According to the present invention, such a tipover of the machine is prevented by blocking the swing axle 14. According to the present invention, the fact that tipping of the machine is imminent or that the machine is in danger of tipping is determined based on the load applied to the traveling devices 6 of the locking axle 13, which is detected by a control device. As soon as the load has reached a threshold value, either from above or from below depending on the selection of the measured value, the control device blocks the swing connection 12 and prevents the swing axle 14 from swinging. In other words, the forced coupling of the height adjustment of the traveling devices 6 of the swing axle 14 is canceled. In this state shown in FIG. 4, the traveling devices 6 of the swing axle 14 are therefore no longer freely height-adjustable relative to the machine frame 3, but are fixed in a fixed height position relative to the ground 8, analogously to the traveling devices 6 of the locking axle 13. In this manner, the traveling devices 6 of the swing axle 14 now each form a fixed resting point for the machine frame 3. The machine therefore rests on a total of four fixed resting points, all formed by the traveling devices 6 of the locking axle 13 and the swing axle 14. Connecting these four points with tipover lines 15 results in the quadrangle shown in FIG. 4, with one of the tipover lines 15 running along the swing connection 12. It is immediately apparent that the area of the quadrangle outlined by the tipover lines 15, within which the center of gravity 16 can move without danger, is significantly larger than that of the triangle shown in FIG. 3. Again, this is illustrated by the dotted, shifted center of gravity. The latter is shifted by the same distance from the initial position in both FIGS. 3 and 4. With the swing mechanism activated according to FIG. 3, it has already reached a tipover line 15 due to a lateral inclination of the machine frame 3, which means that in the situation according to FIG. 3 the machine already starts to tip. With the swing axle 14 blocked according to FIG. 4, on the other hand, the dotted center of gravity is shifted just as far as in FIG. 3 but is still well within the area of the quadrangle outlined by the tipover lines 15. In the situation according to FIG. 4, in which the swing axle 14 has been blocked according to the present invention, the machine is thus still stable on the ground 8 and there is no risk of tipping. The inclination of the ground 8 and the machine frame 3, on the other hand, are the same as in FIG. 3. In this manner, the blocking of the swing axle 14 according to the present invention prevents the machine from tipping when the ground is inclined, for example when working on slopes.

Figure 5:
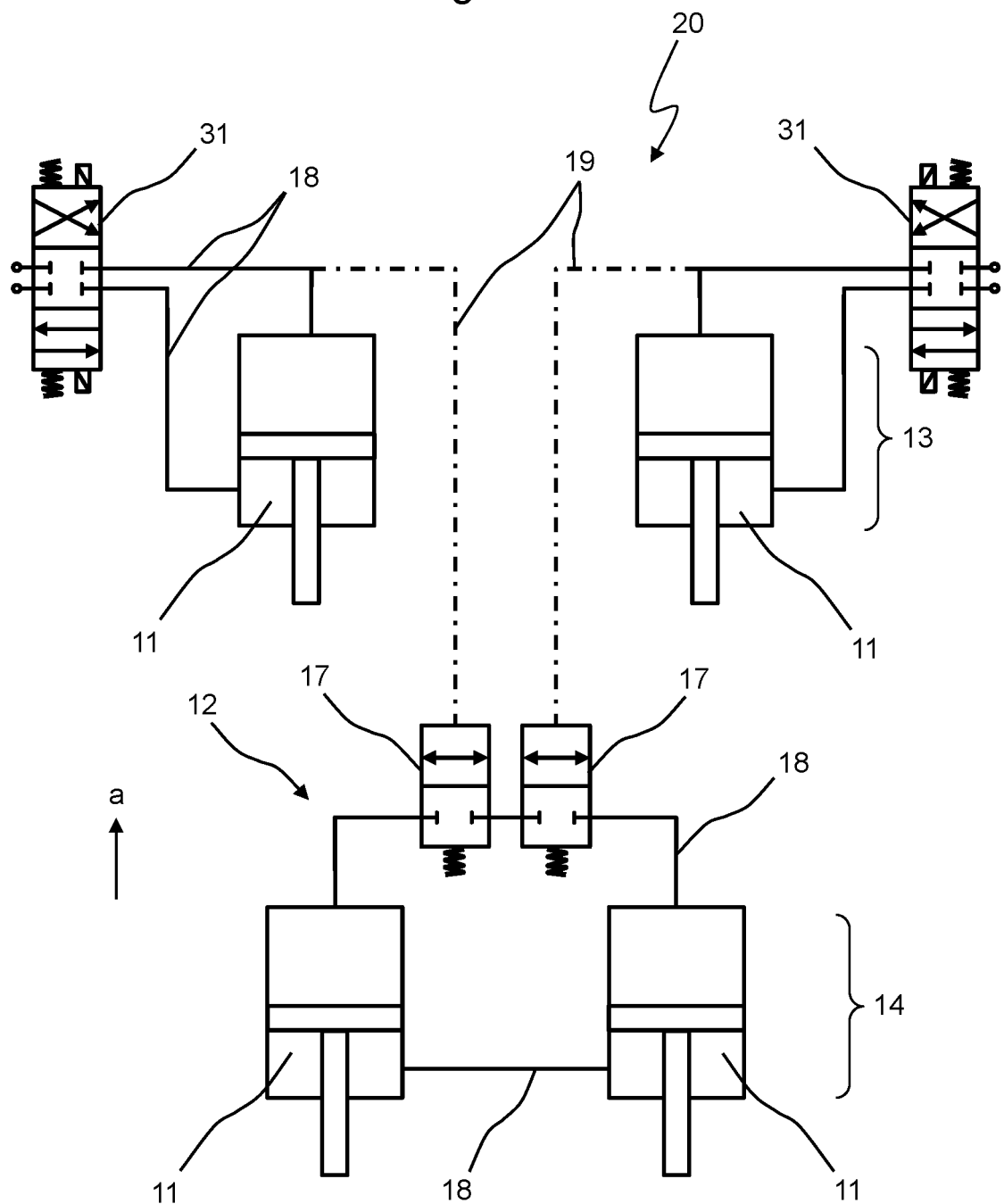
FIG. 5 is a hydraulic diagram of a hydraulic control device.

FIG. 5 shows an exemplary diagram of a hydraulic control device 20 for implementing the present invention. In particular, FIG. 5 shows the lifting columns 11, or their double-acting hydraulic cylinders, of the traveling devices 6 of the locking axle 13 and the swing axle 14. Specifically, the piston side and the rod side of the hydraulic cylinders of the locking axle 13 are each connected via hydraulic lines 18 to a height adjustment valve 31 through which the height position of the respective lifting column 11 can be adjusted independently of the other lifting column 11 of the locking axle 13. The height adjustment valves 31 are connected to the hydraulic system of the machine in a known manner and can be controlled, for example, via the on-board computer. In this manner, a desired height relative to the machine frame 3 can be set on both traveling devices 6 of the locking axle 13. The hydraulic cylinders of the lifting columns 11 of the swing axle 14, on the other hand, are hydraulically forcibly coupled. More specifically, both the piston sides and the rod sides are interconnected via hydraulic lines 18, so that raising one lifting column 11 automatically results in lowering the other lifting column 11 and vice versa.

The hydraulic control device 20 now additionally has a control line 19 and a blocking valve 17 for each of the lifting columns 11 of the locking axle 13. The blocking valves 17 are arranged in the swing connection 12 in such a way that they can either release or block the hydraulic connection between the piston side and/or the rod side of the hydraulic cylinders of the lifting columns 11 of the swing axle 14. They are preloaded, for example by a spring preload biasing them towards the blocked position. In the embodiment example shown, the control lines 19 are connected to the piston side of the hydraulic cylinder of the respective lifting column 11. The pressure in the control line 19 therefore corresponds to the respective pressure on the piston side of the hydraulic cylinder. In addition, the pressure on the piston side of the hydraulic cylinder of the lifting column 11 when the hydraulic cylinder is fixed with respect to the height adjustment is a measure of the load or weight of the machine resting on this lifting column 11.

In normal operation, a sufficiently large proportion of the weight of the machine rests on the respective lifting columns 11 of the locking axle 13, so that the pressure on the piston sides of the hydraulic cylinders and thus also in the control lines 19 is great enough to move the blocking valves 17 into the released position against their preload, in which they establish the hydraulic connection between the piston sides and/or rod sides of the hydraulic cylinders of the lifting columns 11 of the swing axle 14. If the load on the lifting column 11 decreases, the pressure on the piston side of the hydraulic cylinder also decreases. If the pressure in a control line 19 falls below a threshold value defined by the force of the preload of the blocking valve 17, the pressure in the control line 19 is no longer sufficient to hold the blocking valve 17 in the released position. The preload causes the blocking valve 17 to switch to the blocked position and disconnect the hydraulic connection between the piston sides and/or the rod sides of the hydraulic cylinders of the lifting columns 11 of the swing axle 14. In other words, the blocking valve 17 blocks the swing mechanism and blocks the swing function of the swing axle 14, thus achieving the improvement in the stability of the ground milling machine 1 already described above.

If the inclination of the machine frame 3 relative to the horizontal decreases, the pressure in the control line 19 increases. Once the pressure in the control line 19 exceeds the threshold value, it is sufficient to move the blocking valve 17 against its preload towards the released position, thereby unblocking the swing axle 14. All in all, the hydraulic control device 20 thereby realizes in a simple manner the blocking according to the present invention and, moreover, even automatic release of the swing axle 14.

According to another embodiment, an electronic control device 21 may be provided in addition or as an alternative to the hydraulic control device 20, as shown, for example, in FIG. 3. The electronic control device 21 is connected to at least one load sensor 22, in the shown embodiment example one load sensor 22 per traveling device 6 of the locking axle 13. For example, the load sensors 22 may also determine the pressure at the hydraulic cylinders of the lifting columns 11, as discussed above. In addition, the load sensors 22 may also be configured to determine the weight of the machine resting on the respective lifting columns 11. Finally, the load sensors 22 may, additionally or alternatively, also be inclination sensors that determine the transverse and longitudinal inclination of the machine and thus indirectly allow conclusions about the loads applied to the lifting columns 11 or traveling devices 6. The electronic control device 21 may be used with all height-adjustable lifting columns 11, even if they are not operated hydraulically. Since the electronic control device 21 performs all the functions already explained by means of electronic actuation, any actuators may be used.

In order to inform the operator of a blocking of the swing axle 14 and to give him the opportunity to react to a possible dangerous situation in an appropriate manner, an indicating apparatus 30 is also provided, which is shown, for example, in FIGS. 1 and 2. The indicating apparatus 30 is configured to indicate a blocking of the swing axle 14, for example via a visual and/or acoustic warning signal. For example, the indicating apparatus 30 may be part of the on-board computer of the machine.

Figure 6:
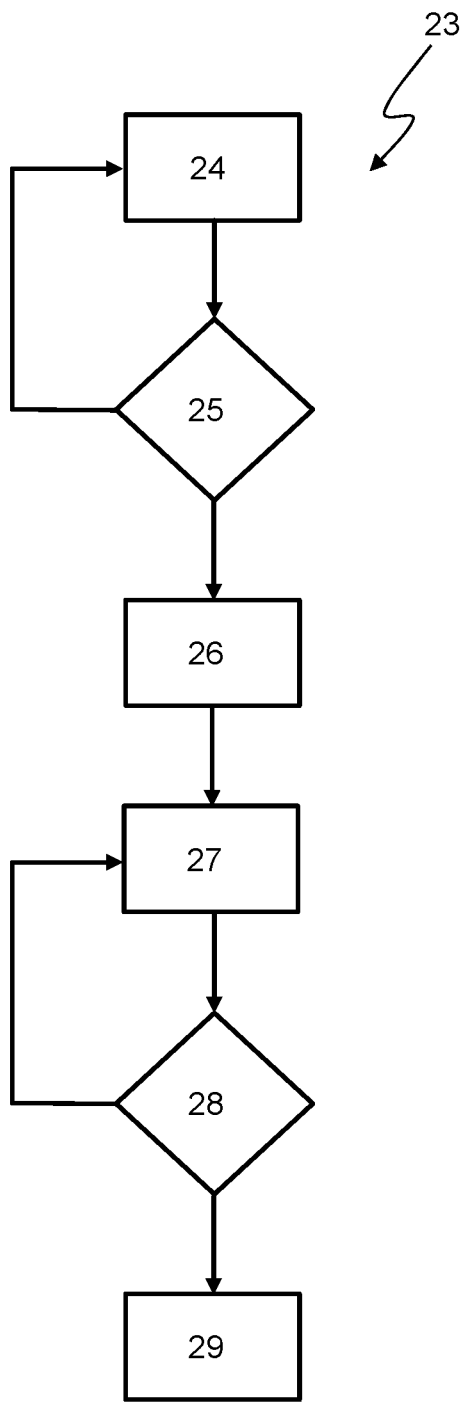
FIG. 6 is a flow chart of the method.

FIG. 6 shows a flowchart of the method 23. The method 23 starts with monitoring 24 the load on at least one traveling device 6 of the locking axle 13 of the construction machine. The next step includes comparing 25 the determined load value to a specified threshold value. If the determined load value is above or below the threshold value such that there is no danger of tipping, the method 23 is simply repeated from the beginning. If, on the other hand, a value is determined that is above or below the threshold value such that the machine is in danger of tipping, the next step includes blocking 26 the swing axle 14 as described above. In addition, indicating 27 of a warning to the operator is performed via the indicating apparatus 30. In order not to leave the further procedure entirely in the operator's area of responsibility, further monitoring of the load on at least one traveling device 6 of the locking axle 13 and comparing 28 of the determined value to the specified threshold value is also carried out thereafter. If the determined value continues to indicate a dangerous situation, the blocking of the swing axle 14 is maintained and the warning also continues to be indicated. If, on the other hand, the comparison of the determined load value to the threshold value indicates that the dangerous situation is no longer present, unblocking of the swing axle 14 and/or stopping of the display of the warning are performed in step 29. It is also possible that an unblocking of the swing axle 14 must be confirmed by the operator so that he cannot be taken by surprise by the sudden additional movability of the machine frame 3.

Overall, the present invention represents a significant improvement in the stability of the construction machine on beveled ground, which leads to a significant increase in working safety both with respect to the operator of the machine itself, as well as to bystanders and ultimately also to the machine. At the same time, the machine operator is not burdened with additional tasks, but can concentrate on his other activities.

What is claimed is:

1. A construction machine, comprising:
   a drive motor;
   a machine frame supported by a traveling gear with traveling devices; and
   an operator platform arranged on the machine frame,
   wherein the traveling gear has a front and a rear traveling gear axle, and wherein at least one of the traveling gear axles is configured as a locking axle with two traveling devices which are height-adjustable relative to the machine frame independently of one another and can be locked in an operating position, and at least one further traveling gear axle is configured as a swing axle such that the traveling devices of the swing axle are jointly height-adjustable relative to the machine frame, and a height adjustment of one traveling device of the swing axle leads to an opposite height adjustment of another traveling device of the swing axle, and
   wherein a control device is provided which is configured such that it detects the load on at least one of the traveling devices of the locking axle as a control variable and, when the load on the traveling device of the locking axle falls below or exceeds a threshold value, blocks the joint height adjustment of the traveling devices of the swing axle relative to the machine frame.

2. The construction machine according to claim 1, wherein the traveling devices of the swing axle are height-adjustable via hydraulic lifting columns.

3. The construction machine according to claim 2, wherein a hydraulic blocking valve is provided via which the height adjustment of the traveling devices of the swing axle can be blocked.

4. The construction machine according to claim 3, wherein the hydraulic blocking valve is a 2/2-way valve and is preloaded towards the blocking switching position.

5. The construction machine according to claim 1, wherein the traveling devices of the locking axle are height-adjustable via hydraulic lifting columns.

6. The construction machine according to claim 5, wherein the control device is a hydraulic control device and the load on the at least one traveling device of the locking axle is detected as a hydraulic pressure applied to the lifting column of the traveling device of the locking axle.

7. The construction machine according to claim 6, wherein the hydraulic control device detects the hydraulic pressure applied to the lifting column of the traveling device of the locking axle via a control line.

8. The construction machine according to claim 7, wherein the hydraulic pressure applied to the lifting column of the traveling device of the locking axle is applied to a blocking valve via the control line such that the hydraulic pressure counteracts a preload of the blocking valve towards a blocked position.

9. The construction machine according to claim 1, wherein the control device is an electronic control device and is connected to at least one load sensor, and wherein the load sensor detects at least one of the following variables:
   a hydraulic pressure applied to the lifting column of at least one of the traveling devices of the locking axle;
   a weight applied to at least one traveling device of the locking axle; and
   a transverse and/or longitudinal inclination of the machine frame.

10. The construction machine according to claim 9, wherein the load sensor comprises a force transducer and/or an inclination sensor.

11. The construction machine according to claim 1, wherein an indicating apparatus is provided which is configured to indicate a warning to the operator of the construction machine when the height adjustment of the traveling devices of the swing axle is blocked.

12. The construction machine according to claim 1, wherein the control device is configured to release the joint height adjustment of the traveling devices of the swing axle relative to the machine frame when the load on the at least one traveling device of the locking axle exceeds or falls below the threshold value.

13. A method for increasing stability of a construction machine according to claim 1, in operation, comprising the steps of:
   a) monitoring a load on at least one traveling device of a locking axle of the construction machine,
   b) comparing the load on the traveling device of the locking axle to a threshold value, and
   c) blocking a height adjustment of traveling devices of a swing axle of the construction machine when the load on the traveling device of the locking axle falls below or exceeds the threshold value.

14. The method according to claim 13, wherein step c) is followed by indicating a warning for the user of the construction machine.

15. The method according to claim 13, wherein further monitoring of the load on the traveling device of the locking axle and comparing to the threshold value is performed even after blocking, and that upon exceeding or falling below the threshold value at the traveling device of the locking axle at least one of the following steps is performed:
   unblocking the height adjustment of the traveling devices of the swing axle of the construction machine; and
   stopping the display of the warning.

16. The construction machine according to claim 1, wherein the construction machine comprises a ground milling machine.

17. The construction machine according to claim 10, wherein the force transducer comprises a load cell, a strain gauge and/or a piezoelectric sensor.

* * * * *